Nov. 3, 1959     R. B. HOLDER     2,911,017
MITER GUIDE
Filed May 8, 1957     3 Sheets-Sheet 1
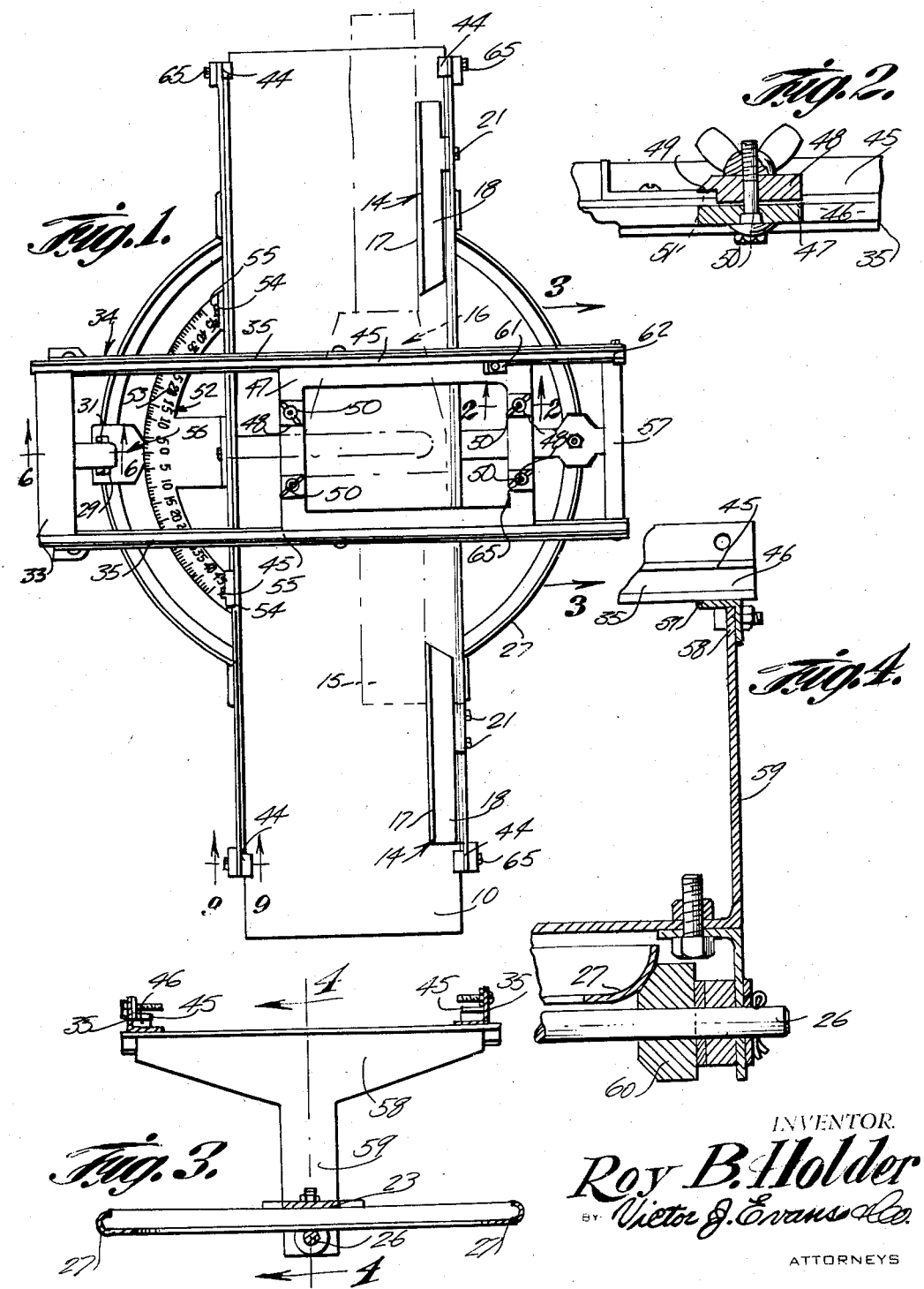
INVENTOR.
Roy B. Holder
BY Victor J. Evans & Co.
ATTORNEYS

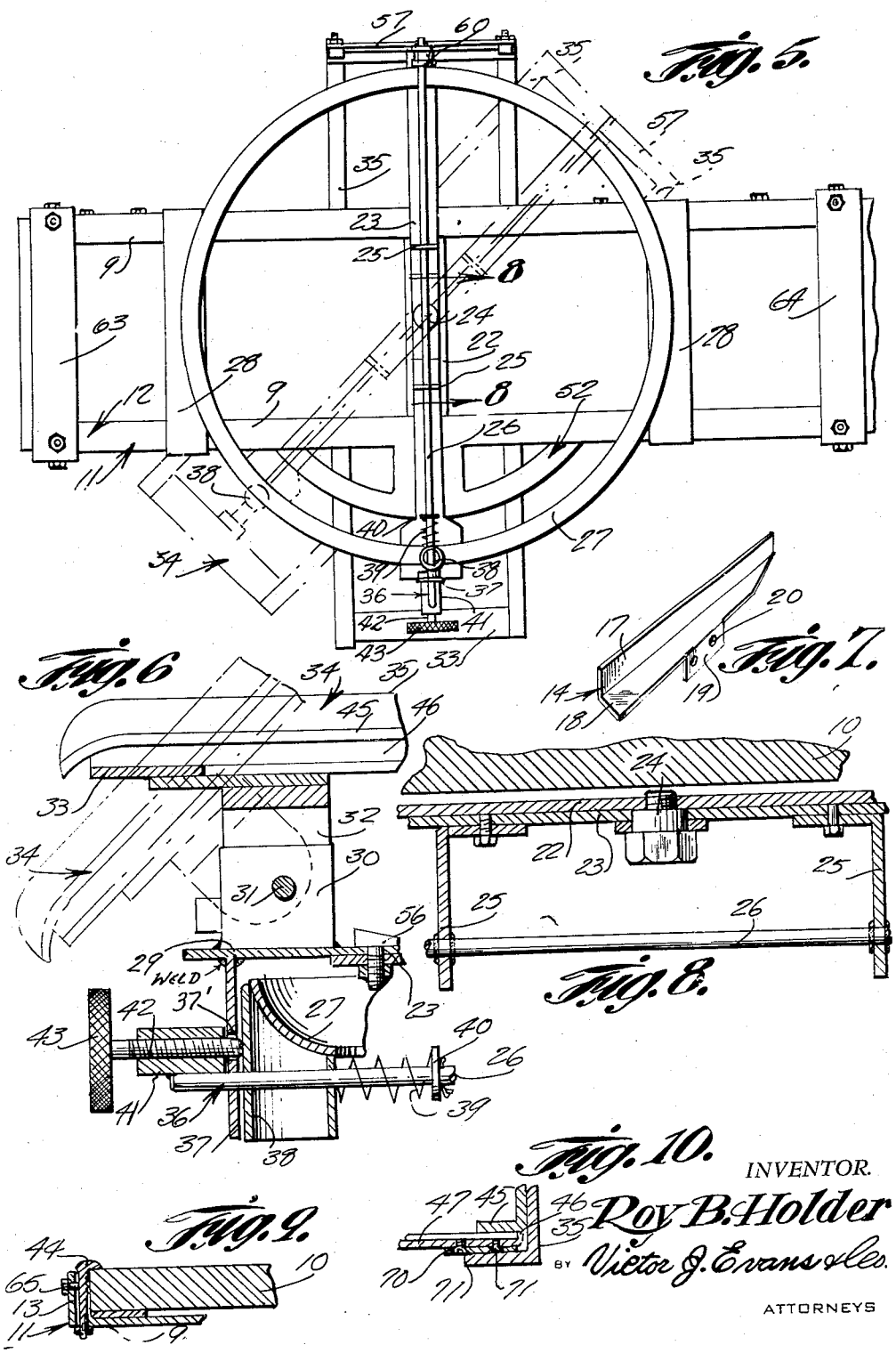

Nov. 3, 1959

R. B. HOLDER 2,911,017

MITER GUIDE

Filed May 8, 1957

INVENTOR.

*Roy B. Holder*

BY *Victor J. Evans & Co.*

ATTORNEYS

United States Patent Office 2,911,017
Patented Nov. 3, 1959

2,911,017

MITER GUIDE

Roy B. Holder, Pulaski, Tenn., assignor to Harold E. Henegar, Pulaski, Tenn.

Application May 8, 1957, Serial No. 657,838

1 Claim. (Cl. 143—6)

This invention relates to a miter guide for a power driven saw.

The object of the invention is to provide a miter guide which is adapted to be used as a support and guiding means for a power driven saw whereby various materials such as wood can be accurately cut.

Another object of the invention is to provide a miter guide which can be adjusted to different angular positions so that a power driven saw can be used to cut material such as wood along different angular positions, and wherein there is provided a means for maintaining the parts immobile in their adjusted positions.

A further object of the invention is to provide a miter guide for a power saw which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a top plan view of the miter guide, constructed according to the present invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 3.

Figure 5 is a bottom plan view of the miter guide.

Figure 6 is a fragmentary sectional view illustrating the locking mechanism.

Figure 7 is a perspective view of one of the guide members for the workpiece being cut.

Figure 8 is a sectional view taken on the line 8—8 of Figure 5.

Figure 9 is a sectional view taken on the line 9—9 of Figure 1.

Figure 10 is a fragmentary sectional view illustrating certain constructional details of the apparatus.

Figure 11:
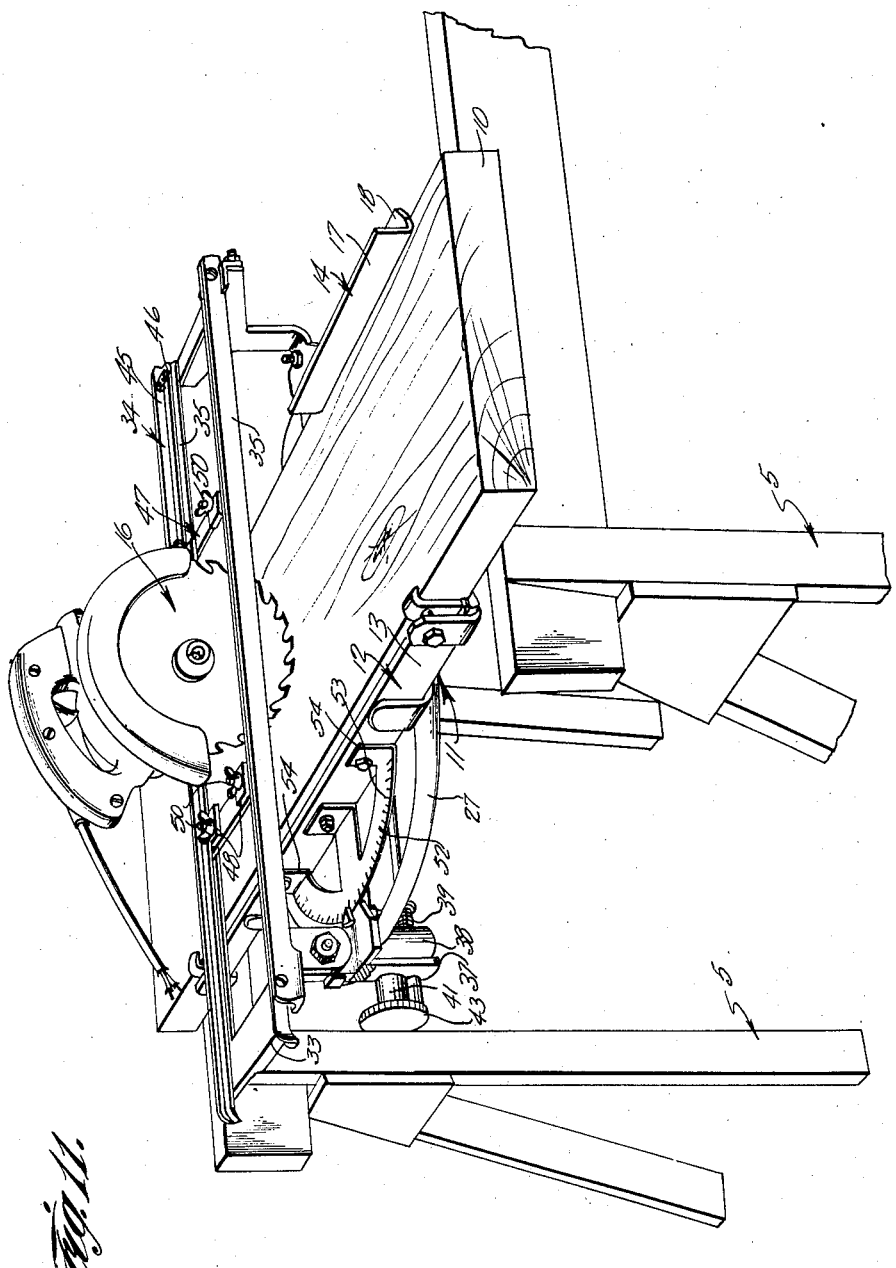
Figure 11 is a perspective view illustrating the present invention.

Referring in detail to the drawings, the numeral 10 indicates a horizontally disposed support member which can be made of any suitable material such as wood, and connected to the support member 10 is a stationary base which is indicated generally by the numeral 11, Figure 5. The base 11 includes a pair of spaced parallel L-shaped bars 12, and each bar 12 includes a vertically disposed portion 13 and a horizontally disposed portion 9, Figure 9.

Connected to one of the bars 12 is a pair of aligned spaced apart guide members 14, Figures 1 and 7, and the guide members 14 are adapted to be abutted by or engaged by a workpiece 15 which may be a piece of wood that is being cut by the power saw 16. Each guide member 14 includes portions 17 and 18 and a depending flange 19 which is provided with a plurality of openings 20 whereby suitable securing elements such as bolts 21 can be extended therethrough for connecting the guide members 14 to the bar 12.

Extending between the bars 12 and secured thereto as by welding, is a plurality of spaced parallel braces 28. There is further provided a crosspiece 22 which extends between the bars 12 and is secured thereto, Figure 8. An arm 23 is positioned below the crosspiece 22, and the arm 23 is pivotally connected to the cross piece 22 through the medium of a pivot pin or bolt 24. The lugs 25 depend from the arm 23, and the lugs 25 provide a support for a rod 26, the rod 26 being fixedly secured to the lugs 25. A ring or circular bracket 27 is secured to the base 11 as by welding, for a purpose to be later described.

Secured to an end of the arm 23 is a platform 29 which has a lip 30 extending upwardly therefrom and secured thereto, Figure 6. A pair of spaced parallel ears 32 are pivotally connected to the lip 30 through the medium of a pivot pin or bolt and nut assembly 31, and the ears 32 are secured to an end member 33 which forms part of a movable frame 34. The frame 34 includes a pair of spaced parallel rails or tracks 35, for a purpose to be later described.

A locking means is provided for maintaining the frame 34 immobile in its various adjusted positions with respect to the stationary ring 27 and with respect to the stationary base 11, and this locking means is indicated generally by the numeral 36, Figure 6. The locking means 36 includes a plate 37 which depends from the platform 29 and is secured thereto as by welding, and arranged contiguous to the plate 37 is a movable locking collar 38 which is mounted for movement into and out of locking engagement with respect to the ring 27. A coil spring 39 is circumposed on the rod 26, and a stop member 40 abuts an end of the coil spring 39, the coil spring 39 serving to normally urge the collar 38 away from the ring 27. A sleeve 41 is secured as by welding to an end of the rod 26, and a set screw 42 is arranged in threaded engagement with the sleeve 41 and projects through an opening 37' in the plate 37 and engages the collar 38 so that the collar 38 is urged against the ring 27. The set screw 42 does not threadedly engage the plate 37. The set screw 42 is provided with knurled knob 43 for facilitating the manual adjustment of the set screw.

As shown in Figure 9, clamps 44 are connected to the bars 12, and the clamps 44 are adapted to engage the support member or beam 10 so as to help maintain the base 11 connected to the support member 10.

Secured to each of the rails or tracks 35 is an L-shaped tongue 45 which coacts with the track 35 to define a space 46 therebetween, Figure 3. A carriage 47 has portions thereof slidably mounted in the spaces 46, and the carriage 47 has the power saw 16 detachably connected thereto. For detachably connecting the power saw 16 to the carriage 47, clamps 48 are provided, Figure 2, and the clamps 48 have cutout portions 49 which receive portions 51 of the saw 16 therein, and the clamps 48 are maintained in their proper position by means of bolt and nut assemblies 50.

There is further provided a scale or indicator means for permitting the user to accurately set the device to any desired angular position, and this means comprises a plate 52 which is provided with scale markings 53 thereon, Figure 1. The plate 52 includes flanges 54 which are secured to the adjacent bar 12 through the medium of suitable securing elements such as the bolts 55. A pointer 56 is provided, and the pointer 56 may be formed on the upper end of a bolt or securing element which extends down through the platform 29, Figures 1 and 6. The pointer 56 is adapted to coact with the scale markings 53 on the plate 52 whereby the position of the frame 34 and saw 16 can be accurately determined, with respect to the stationary base 11 and stationary ring 27.

A means is provided for supporting the free end of the frame 34, and this means comprises an L-shaped end piece 57 which extends between the tracks 35 and is secured thereto as by welding. The end piece 57 is adapted to engage a wide portion 58 which is arranged on the upper end of an upright 59, Figure 3 and Figure 4. As shown in Figure 4, a roller 60 is mounted on the rod 26, and the roller 60 is adapted to engage the ring 27 so as to help maintain the parts in their proper position as they move relative to each other.

From the foregoing, it is apparent that there has been provided a miter guide which is especially suitable for use with a power saw such as the saw 16. In use, the support member 10 or beam 10 is adapted to be supported on any suitable mechanism such as sawhorses 5, and the base 11 is fastened to the support member 10 as shown in the drawings. Thus, the base 11 includes a pair of spaced parallel bars 12 which engage side portions of the support member 10, and the clamps 44 help maintain the bars 12 connected to the support member 10. The pair of guide members 14 are connected to one of the bars 12 through the medium of the bolts 21, and these guide members 14 are arranged in alignment with respect to each other as shown in Figure 1. A piece of wood 15 which is to be cut by the saw 16, rests on the support member 10 and abuts the pair of guide members 14. Then, with the parts in their assembled position, the saw 16 can be moved along the frame 34 and the saw 16 is of conventional construction and includes the usual hand grip, and the saw 16 may be connected to a suitable source of electrical energy by means of the usual electric wire. The saw 16 is connected to the carriage 47 through the medium of the clamps 48, Figure 2, so that when the saw 16 is to be removed from the device, the bolts 50 can be readily unscrewed so as to permit the saw to be disconnected or removed, so that it can be used in any other locality as desired. The side edges or portions of the carriage 47 are slidably mounted in the spaces 46 which are defined in the tracks 35 so that the carriage 47 and saw 16 will be maintained in their proper positions during movement thereof. As previously described, there is provided the locking mechanism 36 which maintains the frame 34 immobile in its various adjusted positions. However, when different angular cuts are to be made in the piece of wood 15 by the saw 16, it is only necessary to manually unscrew the set screw 42 by gripping the knob 43 whereby the coil spring 39 will urge or push the collar 38 away from the ring 27 and this will permit the frame 34 to rotate around the ring 27. When the frame 34 has been moved to the desired location as indicated by the pointer 56 coacting with the scale markings 53, then the set screw 42 can be again rotated inwardly so that the inner end of the shank of the set screw 42 will engage the collar 38 to thereby move the collar 38 into frictional engagement with the outer periphery of the ring 27 so that accidental shifting of the frame 34 from its proper position will be prevented, the set screw 42 extending through the opening 37' as previously described.

The carriage 47 is provided with a stop member 61, Figure 1, which is adapted to engage a stop pin 62 so as to limit forward movement of the carriage 47. Furthermore, by loosening the bolt and nut assembly 31, the frame 34 can be pivoted or swung from the solid line position shown in Figure 6 to the dotted line position of Figure 6 whereby the frame 34 can be raised as when a piece of wood 15 is being removed or placed in a position to be cut. The pin 24 provides a pivotal connection between the crosspiece 22 and the arm 23. The crosspiece 22 is stationary since it is secured to the stationary bars 12. The arm 23 can pivot about an axis extending through the pin 24, and the arm 23 provides a support for the adjustable frame 34 which carries the movable saw 16. As shown in Figure 5, the base 11 may be provided with end members 63 and 64. The locking mechanism 36 can be used for locking the frame 34 in any desired angular position. The set screw 65 shown in Figure 9 serves to urge or bias the hanger bolt 44 against the support member 10. The device is properly balanced and the device is safe to use and also damage to the saw is prevented. The saw tracks 35 are supported at both ends so that twisting of the tracks is prevented whereby the saw will cut the wood 15 accurately. The frame 34 can be tilted back from the solid line position to the dotted line position of Figure 6 when a piece of wood 15 is to be removed or replaced. Also, the clamping means shown in Figure 2 prevent the saw 16 from becoming accidentally disengaged from the carrier 47, and the carrier or carriage 47 is maintained in the guideways or spaces 46.

The miter guide of the present invention is adapted to be used with electric hand saws such as the saw 16 and can be used in cutting standard stock lumber of different sizes. The miter guide is easy to operate and safe to use, it is simple in construction, accurate to use, light in weight and occupies a very little space to set up and operate in. Also, the device is constructed so that the table or support member 10 will not twist or sag so that a uniform cut can be made at all times. The device can be set on a floor or workbench. The plate 52 can be provided with the calibrations 53 so as to permit an accurate setting of the frame, whereby the operator can select a desired angle of cut. The roller 60 helps minimize friction between the moving parts. The carriage 47 can be modified so as to support different types of conventional saws. By using a long table or support member, any number of pieces of lumber can be cut the same length. Also, the miter guide permits compound angles to be cut, and the device can also be used as a square miter. The parts can be made of any suitable material and in any desired shape or size. The calibrated plate 52 permits angular cuts to be made as desired. The rod 26 provides a support for the locking device 36. When the frame 34 moves down to a horizontal position, the member 57 engages the portion 58 of the upright 59 so as to provide a support for the frame.

As shown in Figure 10, there is provided a slide 70 which is attached to the member 47 in any suitable manner, such as by means of securing elements 71, and the slide 70 serves to prevent undue wear between the parts. The slide 70 can be made of hardened steel which will not readily wear out.

The above description of the invention is for illustrative purposes only and it is understood that modifications may be made in the construction within the scope and spirit of the following claim.

I claim:

A miter gauge comprising a horizontally disposed support, a stationary base embodying a pair of bars contiguous to the side portions of said support, clamps connected to said side bars and engaging said support to secure said base to said support, braces extending between said bars and arranged below said support, said braces being fastened to said bars, a crosspiece disposed between said braces, said crosspiece extending between said bars and fastened thereto, a horizontal arm positioned below said crosspiece, a vertical securing element pivotally connecting said arm to a mid point of said crosspiece, a pair of lugs depending from said arm, said lugs being arranged in spaced parallel relation with respect to each other, a rod extending through said pair of lugs and fixedly secured thereto, a ring positioned in a horizontal plane below said base and secured to said base concentric with said securing element, a vertically swingable frame arranged on said horizontal arm above said support and embodying a pair of tracks, a carriage slidably connected to said tracks for supporting a saw, the means mounting said vertically swingable frame comprising a platform fastened to an end of said arm, a lip having said frame pivotally connected thereto, said lip extending upwardly from said platform and being secured thereto, a horizontal arcuate plate concentric with said ring and securing means including flanges secured to one of said bars and said plate having scale markings thereon, a securing element extending vertically through said platform and having a pointer on its upper end for coaction with said scale markings, means on said rod engageable with said ring to lock the arm and the frame carried therewith in a selected position of angular adjustment about said securing means, means for releasably clamping the saw to the carriage, and guide members connected to one of the bars for engagement by a workpiece.

References Cited in the file of this patent
UNITED STATES PATENTS

| | | |
|---|---|---|
| 1,846,641 | Hedgpeth | Feb. 23, 1932 |
| 1,874,175 | Earhart | Aug. 30, 1932 |
| 2,335,783 | Mills | Nov. 30, 1943 |
| 2,589,554 | Killian | Mar. 18, 1952 |
| 2,596,524 | Bridwell | May 13, 1952 |
| 2,627,287 | McCluskey | Feb. 3, 1953 |
| 2,633,162 | Neuenschwander | Mar. 31, 1953 |
| 2,651,333 | Spinney | Sept. 8, 1953 |